March 18, 1952 A. J. CORNS 2,589,778
GAS BURNING METAL TIRE HEATER
Filed Aug. 3, 1948 2 SHEETS—SHEET 1
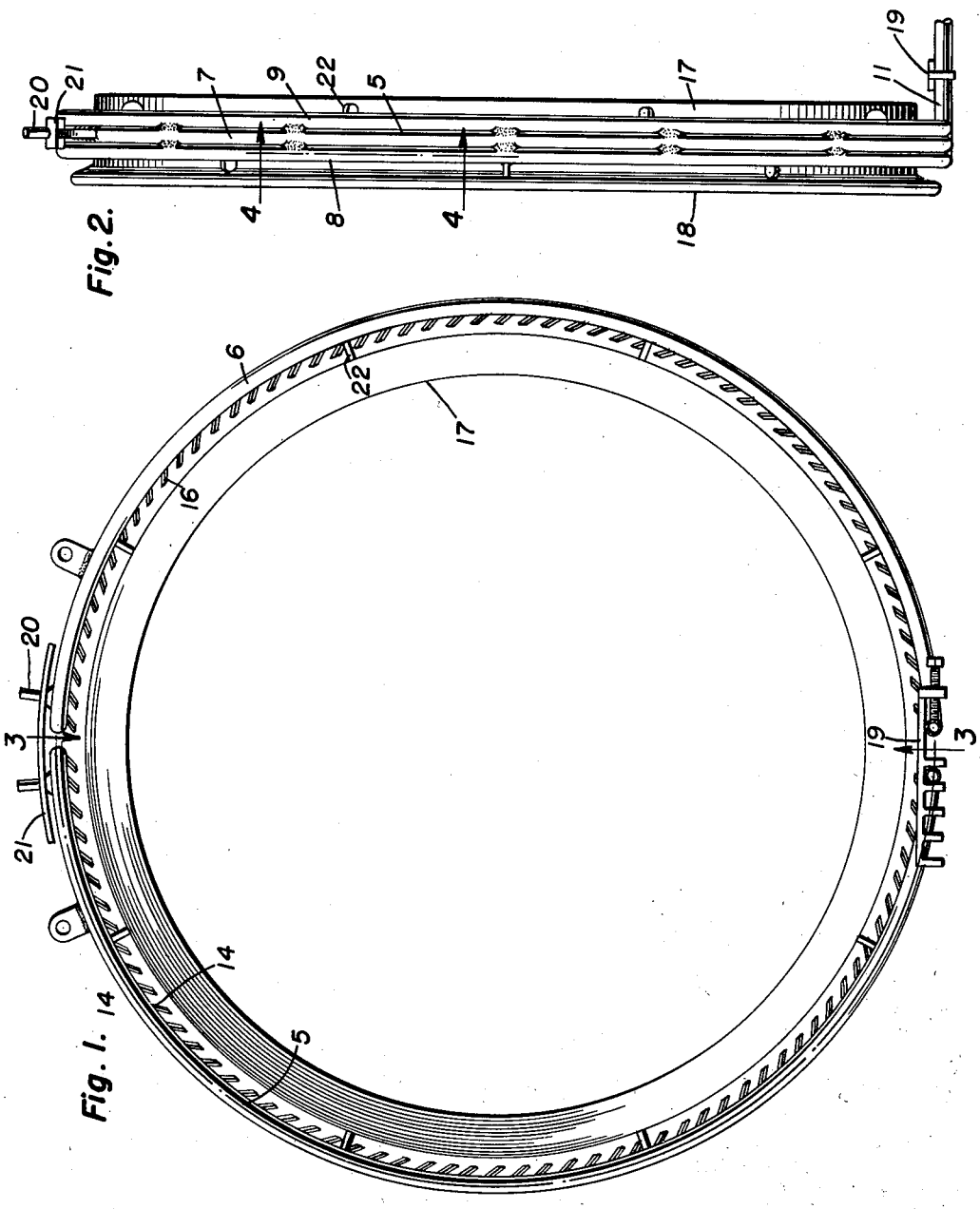
Alfred J. Corns
INVENTOR.

March 18, 1952  A. J. CORNS  2,589,778
GAS BURNING METAL TIRE HEATER
Filed Aug. 3, 1948  2 SHEETS—SHEET 2
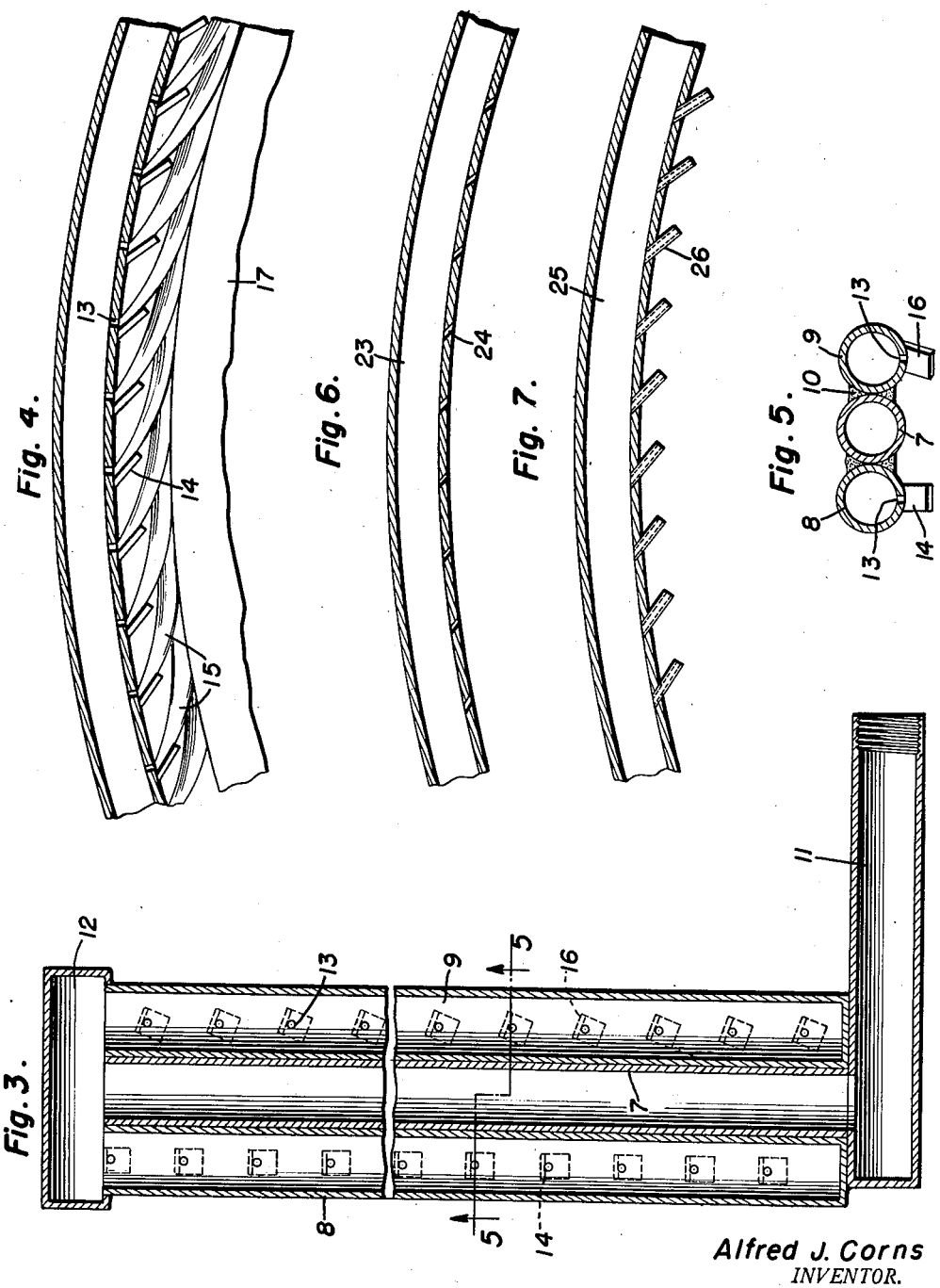
Alfred J. Corns
INVENTOR.

Patented Mar. 18, 1952

2,589,778

UNITED STATES PATENT OFFICE 2,589,778

GAS BURNING METAL TIRE HEATER

Alfred J. Corns, East Beckley, W. Va.

Application August 3, 1948, Serial No. 42,191

4 Claims. (Cl. 158—108)

The present invention relates to new and useful improvements in metal tire heaters and more particularly to a heater designed for use with the expansion of metal tires such as are used on locomotives and the like.

In mounting and removing tires from the wheels of locomotives and the like the tires are expanded by subjecting the same to a source of heat and then shrunk onto the wheel.

Heretofore tire heaters have applied jets of flame at right angles to the tire surface for heating the tire, the angle of the flame causing the same to rebound and spread toward the side of the tire, thus losing a great portion of the heat and filling the surrounding atmosphere with unburned gas fumes, which are inhaled by the workmen to the detriment of their health and comfort and also causing undue heating of adjacent parts of the locomotive or other equipment.

It is accordingly an object of the present invention to provide a tire heater which eliminates the objectionable features existing in the present tire heaters and to project the flame at an angle to the surface of the tire substantially tangentially thereto whereby to cause the flame to travel in a circumferential direction along the surface of the tire to thus heat the tire more quickly and in a more efficient and economical manner.

A further object of the invention is to arrange the jets or nozzles of the tire heater in a manner whereby the flame of adjacent jets will mingle in a substantially superposed relation one upon the other as the flame travels along the surface of the tire and thus to increase the intensity of the flame with a minimum of loss in its effectiveness.

A still further object is to provide a tire heater of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the tire heater in position on a tire;

Figure 2 is an edge elevational view thereof;

Figure 3 is an enlarged longitudinal sectional view of one section of the heater;

Figure 4 is an enlarged fragmentary circumferential sectional view taken substantially on a line 4—4 of Figure 2;

Figure 5 is a transverse sectional view taken on a line 5—5 of Figure 3; and

Figures 6 and 7 are fragmentary enlarged circumferential sectional views showing modified nozzles or burner orifice constructions for the heater.

Referring now to the drawings in detail and first with respect to the form of the invention illustrated in Figures 1–5 inclusive the numerals 5 and 6 designate a pair of semi-circular heater sections, each of said sections being of duplicate construction and accordingly a detailed explanation of one will suffice for both.

Each of said heater sections includes a central arcuate preheating pipe or tube 7 and a pair of arcuate burner tubes or pipes 8 and 9 suitably secured to the opposite sides of the central pipe 7 by welding or the like as shown at 10. A fuel supply pipe 11 is connected to one end of preheater pipe 7 and a header 12 is suitably secured to the opposite end of preheater pipe 7 and also to the adjacent ends of the burner pipes 8 and 9 to supply fuel to each of the burner pipes and to pass it through the preheater pipe 7.

A plurality of circumferentially spaced apart burner orifices 13 are formed at the inner surface of the burner pipes 8 and 9 and a deflector plate 14 is welded or otherwise suitably secured to the inner surface of each of the burner pipes adjacent each orifice 13 and inclined under the orifice at an angle to the radius of the burner pipes to project a flame 15 from the orifice in a circumferential direction, as shown in Figure 4. The deflectors for one of the burner pipes are also inclined transversely to deflect the flame inwardly toward the center of the group of pipes 7, 8 and 9, as shown at 16 in Figure 3.

The sections 5 and 6 of the heater are assembled on a tire 17 with the deflectors 16 adjacent the outer edge of the tire to prevent the flame from spreading over the edge of the tire and toward a flange 18 at the opposite edge of the tire to keep the flame toward the center thereof. The ends of the sections 5 and 6 provided with the supply pipes 11 are connected together by a suitable connector 19 and the opposite ends of the sections 5 and 6 are provided with radially outwardly projecting pins 20 to which a connector plate 21 is attached. The inner surface of the heater sections are provided with spacing lugs 22 to space the deflectors 14 and 16 away from the surface of the tire.

The pipes 11 are connected to a suitable sort of fuel supply, such as gas or a combustible mixture of air and oil which is ignited at the orifices 13 and a resultant flame 15 is subjected to the surface of the tire for heating the same.

As indicated in Figure 4 of the drawings the flame is projected circumferentially with respect to the surface of the tire whereby the spreading of the flame is confined to a circumferential direction and not to a transverse direction with respect to the tire to thus prevent rebounding of the flame away from the surface of the tire whereby the loss of heat is reduced to a minimum.

In Figure 6 of the drawings the burner pipe 23 is formed with orifices 24 inclined in a circumferential direction to produce a jet of flame at an angle inclined from the radius of a tire to which the same is subjected and in Figure 7 the burner pipe 25 is formed with inclined nozzles 26 which likewise project the flame in a direction circumferentially with respect to a tire.

In view of the foregoing description taken in conjunction with the accompanying drawings it is believed that a clear understanding of the construction, operation and advantages of the device will be quite apparent to those skilled in the art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A burner for heating annular work comprising a pair of annular burner pipes and an annular preheating pipe secured together in side by side coaxial relation with the preheating pipe between the burner pipes, means supplying fluid fuel to said preheating pipe, means communicating the preheating pipe with both burner pipes, burner orifices in the inner circumferential portions of said burner pipes, and means directing a flame from said orifices at an angle to the axis thereof and both circumferentially of said pipes and laterally thereof toward the preheating pipe.

2. A burner for heating annular work comprising a pair of annular burner pipes and an annular preheating pipe secured together in side by side coaxial relation with the preheating pipe between the burner pipes, a fluid fuel supply pipe communicating with said preheating pipe, means communicating the preheating pipe with both the burner pipes, burner orifices in the inner circumferential portions of said burner pipes, and means deflecting a flame from the orifices of at least one of said burner pipes at an angle to the axis of the orifices and both circumferentially of said pipes and laterally thereof toward the other burner pipe.

3. A burner for heating annular work comprising a pair of annular burner pipes and an annular preheating pipe secured together in side by side coaxial relation with the preheating pipe between the burner pipes, a fluid fuel supply pipe communicating with said preheating pipe, means communicating the preheating pipe with both burner pipes, burner orifices in the inner circumferential portions of said burner pipes, and deflectors on said inner circumferential portions adjacent said orifices directing a flame therefrom both circumferentially of said pipes and laterally thereof toward the preheating pipe.

4. A burner according to claim 3 wherein said deflectors comprise plates on said burner pipes inclined therefrom circumferentially and laterally thereof.

ALFRED J. CORNS.

REFERENCES CITED

The following references are of record in the file of this patent:

UNITED STATES PATENTS

| Number | Name | Date |
| --- | --- | --- |
| 652,781 | Johnson | July 3, 1900 |
| 680,455 | Gogel | Aug. 13, 1901 |
| 964,902 | Fall | July 19, 1910 |
| 1,328,330 | Knoflicek | Jan. 20, 1920 |
| 1,775,311 | Halle | Sept. 9, 1930 |